Patented Nov. 20, 1951

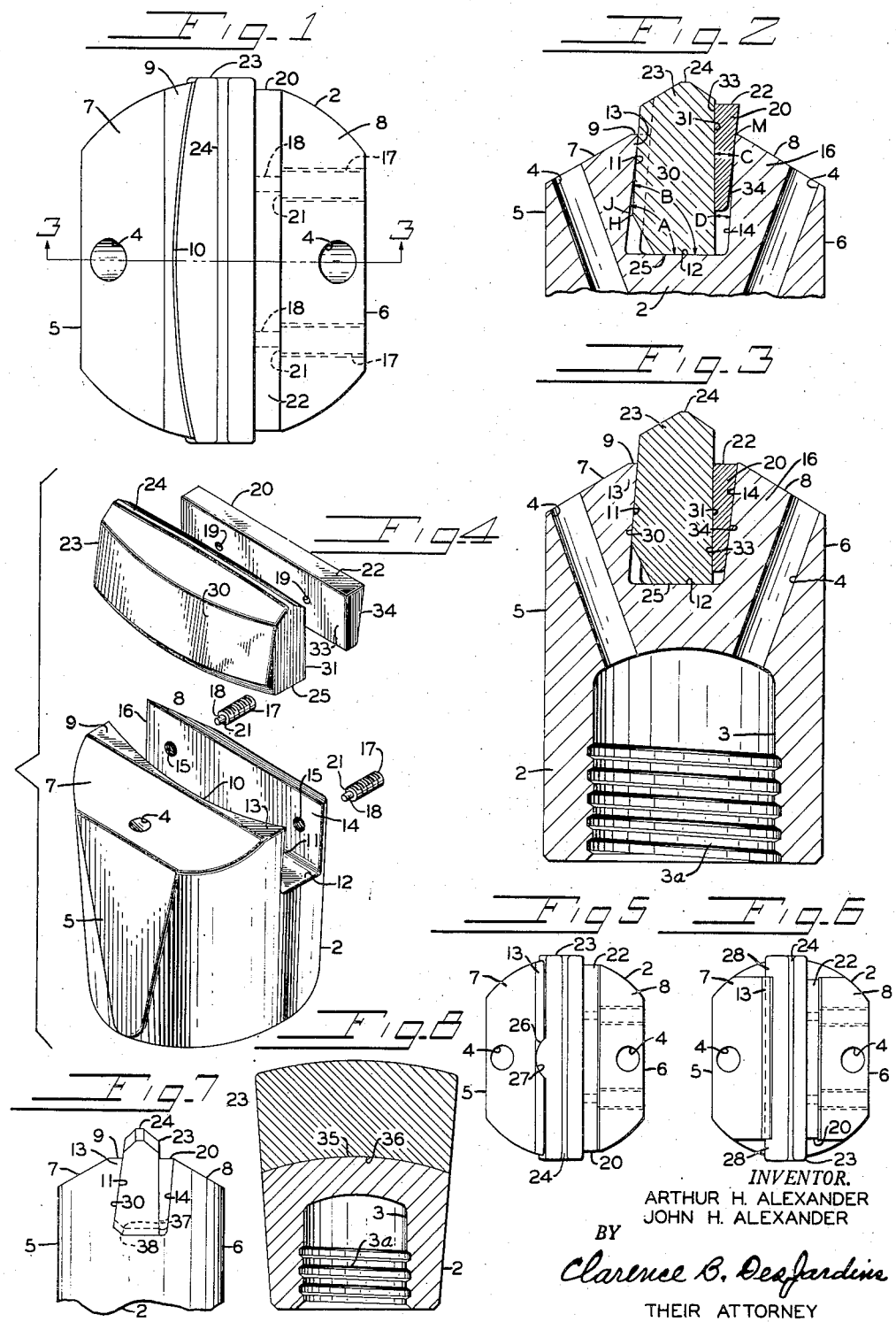

2,575,438

UNITED STATES PATENT OFFICE 2,575,438

PERCUSSION DRILL BIT BODY

Arthur H. Alexander and John H. Alexander, Victoria, British Columbia, Canada, assignors to Kennametal Inc., Latrobe, Pa., a corporation of Pennsylvania Application September 28, 1949, Serial No. 118,278

21 Claims. (Cl. 255—64)

This invention relates to a percussion drill bit body for use with percussion instruments such as jack hammers, drifters, stoppers, and the like, and it pertains more particularly to a steel bit body having a metal cutting insert harder than the drill bit body, such as a sintered hard carbide insert, with a cutting edge, mechanically held against movement in any direction in the steel bit body. The cutting insert is so held in the steel drill bit body that the initial stress for mechanically holding it therein is accurately predetermined, and this initial predetermined holding stress is not increased, but is decreased or even eliminated during the percussion blows in the drilling operation.

Percussion drill bits are commonly made with a chisel-like cutting edge formed on the work facing end of the drill bit body. Percussion forces acting on the cutting edge of such bits, caused by dropping the drill bit or forcing it against the work, wears, chips away or disintegrates the bit's worked edges. Such drills when used for drilling hard rock or other hard substances are subject to intensive wear, fatigue and fracturing forces, as the percussive jarring forces normally used are very great, and the abrasive and cutting action of the substance worked on is very severe on the cutting edge of the drill bit. Metal drills have been made in the past by forming a hard chisel-like cutting edge or edges on the work face end of the drill bit's body. Improvements on such drill bits have been made by joining pieces of special cutting material, formed to an edge, to the work facing portion of the drill bit's body. Such cutting pieces have been made of specially hard metals and have been joined to the drill bit bodies by mechanical locking formations, or by brazing or soldering the pieces to the drill bit bodies.

High cutting rates and long drill bit life have been the objectives most sought after in the percussion drill bit art, as the wearing of the cutting edges of such bits necessitates them being removed to be resharpened or replaced. Accordingly any attachment formation for the cutting inserts which will expedite their replacement and extend the potential life of the drill bit body is an objective.

The best drill bit body material now known is steel, and attempts have been made in the past to supply such drill bit bodies with cutting edges made of sintered hard carbides, which, because of their extreme hardness will cut the hardest rock very fast and remain sharp for a long time as compared with other materials. Certain characteristics of sintered hard carbides have given rise to difficulties in its use in pieces as a cutting element on a drill bit used for high speed drilling wherein large percussive forces are used. These difficulties arise from the failure of the joinder of the sintered hard carbide elements to the drill bit body, from the cracking or fracture of such elements by reason of their mode of joinder to the drill bit body, or from failure of the drill bit body in which the sintered hard carbide cutting elements are secured.

The best sintered hard carbide material has about half the coefficient of expansion of steel and two or three times as great a Young's modulus of elasticity as steel. In addition, in actual practice, the best steel for drill bit bodies having sintered hard carbide cutting inserts has a Rockwell C hardness of between 28 and 36, as compared to ordinary percussion drill steel having a hardness of 45 to 60 Rockwell C, whereas the best sintered hard carbide material has a Rockwell C hardness of between 68 to 78. If such hard carbide edges or cutting pieces are brazed or soldered to a hardened steel bit body, the heat necessary for the brazing or soldering tends to ruin the steel hardness and, in addition, the great differences in the coefficient of expansion of the steel in the sintered hard carbide material cause a differential expansion and contraction between them, producing strains or cracks in the sintered hard carbide cutting material, which cause it to fail after short use. It is inexpedient to overcome such failures by interposing a layer of soft metal between the steel bit body and the sintered hard carbide cutting pieces, because the percussive forces cause the soft metal to squeeze out and break the joinder, thereby releasing the sintered hard carbide cutting pieces. Mainly, however, in the brazing method for attaching the sintered hard carbide cutting pieces, the temperature at which the steel may be heat treated is limited by the thermal characteristics of the brazing material, thus requiring the selection of a steel and a heat treatment for it which can be performed within the limits prescribed by the brazing material. This means that in attaching the cutting pieces to the steel bit bodies, neither the most suitable steel nor the best heat treatment can be used.

Locking formations have also been used as they do permit the selection of the most suitable steel and the most efficient heat treatment because the steel bit body can be completely heat treated prior to inserting the sintered hard carbide cutting pieces in the drill bit body. A common locking formation comprises forcing a tapered cutting body into a slot or groove formed in the working surface of the drill bit body which is of a lesser taper than the cutting piece. However, this locking formation has been unsatisfactory because the percussive forces resulting from the hammer blows from the drilling machines continually force the cutting piece into the slot or groove in the drill body, thereby increasing the stresses in the steel drill bit body far beyond the initial stress that is required for holding the cutting piece therein. This excessive stress in the steel drill bit body results in its rapid failure due to fatigue when the pressures that are created extend beyond the point that the steel is capable of withstanding. Another objection to this locking formation is that there is no means provided for preventing the cutting insert moving lengthwise in the slot or groove, except the mere frictional contact between the contacting surfaces of the drill bit body and the cutting pieces, and this is not enough to secure it against displacement.

In a drill using sintered hard tungsten carbide cutting pieces, the cost of the cutting pieces is fifty percent or more than the cost of the steel drill bit body, particularly where the drill bit body is detachable from the drill. Accordingly, it is especially advantageous to have a drill bit body in which sintered hard carbide cutting pieces can be removed from the drill bit body prior to fatigue failure of said steel body, thereby permitting the cutting inserts to be removed for repeated use in successive bit bodies, inasmuch as the potential life of said cutting pieces and their cost are much greater than the drill bit bodies.

Therefore, it is the principal object of the invention to provide a steel drill bit body in which cutting inserts are mechanically held therein without increasing the initial holding stresses upon the drill bit body.

Another object of the invention is to have the cutting insert secured within the drill bit body by accurately predetermined pressure which is not increased by the drilling operation.

Another object of the invention is to have the cutting insert held in the drill bit body so that the holding stress will be lessened by the drilling operation.

Another object of the invention is to have the cutting insert held in the drill bit body against movement in any direction.

Another object of the invention is to provide such a drill bit body that the cutting inserts may be readily attached to and detached from it.

Another object of the invention is to have the cutting inserts secured in the drill bit body without the wedge holding pressure for the cutting inserts fatiguing the drill bit body.

Another object of the invention is to provide a non-fatiguing wedge holding formation which allows a variation as to the manner of securing the assembly.

Another object of the invention is to have the cutting insert gripped by being clamped at the top of the drill body end and with little, if any, pressure exerted laterally at the base of the slot in the drill bit body.

Further objects, and objects relating to details of construction and economies of operation, will appear from the detailed description to follow. In one instance we have accomplished the objects of our invention by the devices and means described in the following specification. Our invention is clearly defined and pointed out in the appended claims. Constructions constituting preferred embodiments of our invention are illustrated in the accompanying drawings, forming a part of this specification in which:

Fig. 1 is an end view of a drill bit body carrying a cutting insert embodying the invention.

Fig. 2 is a vertical cross sectional view taken on line 3—3 of Fig. 1 but before the wedge is pressed home in final position.

Fig. 3 is a vertical cross sectional view on line 3—3 of Fig. 1 showing the wedge pressed home in final position.

Fig. 4 is an exploded view of the construction in Fig. 1.

Figs. 5 and 6 are end views of two modified forms of the invention.

Fig. 7 is a side elevation, looking at one end of the insert and wedge, of another embodiment of the invention.

Fig. 8 is a cross sectional view, longitudinally of the insert, of the embodiment in Fig. 7.

The invention comprises a drill bit body having a slot in the working surface, one sidewall surface of the slot being formed at an acute angle with the bottom wall surface of the slot, and the other sidewall surface of the slot being formed at an obtuse angle with the bottom wall surface of the slot to have the side walls vertically inclined. A cutting insert of less width than the slot, and adapted to be freely inserted therein, has one side face inclined vertically at a greater angle to that sidewall surface of the slot which it at an acute angle with the bottom of the slot. This provides an overhanging top or wing portion of the drill bit body for gripping the insert. A wedge strip is fitted in the space between the opposite face of the insert and that side surface of the slot which is vertically inclined at an obtuse angle to the bottom of the slot. It has one face parallel with the adjacent face of the insert and its opposite face vertically inclined to the adjacent side wall of the slot at such an inclination to exert lateral pressure on the top of the drill body opposite to the overhanging or wing portion of the other sidewall of the slot. The bottom edge of the cutting insert is directly in contact with the bottom wall surface of the slot. The wedge strip is applied to provide accurately the predetermined pressure desired for holding the cutting insert, and is then itself secured in position in the assembly by any suitable means. The inclination of the side of the cutting insert and the adjacent side wall of the slot, and that of the side of the wedge and adjacent side wall of the slot, are such that the contacting sides are in parallelism when the wedge is forced home, and with lateral pressure exerted only against the sidewalls at the top of the slot. Means is also provided to prevent the cutting insert moving lengthwise of the slot, this means being engaging portions between the two members or engaging portions resulting from the form in which said members are constructed, or providing additional means.

Referring specifically to the drawings in which the same reference numerals are applied to the same parts, numeral 2 designates a drill bit body provided with a socket 3 in one end with screw threads 3a for the reception of the end of a threaded collared drill rod (not shown) to which the drill bit body is secured. The manner of attachment is merely illustrative of one form of connecting the drill bit body to the drill as it may be attached in any conventional way or made integral with the drill rod. Opening on the working surface of the drill bit body, are two passageways 4, each having their opposite ends opening in the bottom of the socket to provide channels connecting with a central channel of the drill through which fluid, such as air or water, is discharged as is conventional in the art to which this invention relates. The drill bit body, made of steel specified above, is of a modified circular cross section, such modification consisting of slightly flattened opposite sides 5 and 6, and chisel-like work facing surfaces 7 and 8 converging to a truncated ridge 9 which is mutilated by a U-shaped slot 10 cut therein along the length of the truncated ridge and into the body of the working surface.

One sidewall surface 11 of the slot 10 is formed at an acute angle with the bottom surface 12 of the slot so that it will incline inwardly, from bottom to top toward the vertical axis, thereby providing an overhanging portion 13 above the bottom surface of the slot. This side wall surface 11 is curved inwardly from one end of the slot to the other to be concave in conformation. The opposite sidewall surface 14 of the slot 10 is formed at an obtuse angle with the bottom surface 12 of the slot 10 so that it will incline outwardly, from top to bottom, away from the vertical axis. Screw threaded holes 15 are formed through portion 16 of the drill bit body, said holes leading through from the outside flattened surface 6 on one side of the drill body to the wall surface 14 of the slot. These holes are for receiving set screws 17 that are screw threaded therein and have reduced ends 18 for projecting into recesses 19 formed in a wedge strip 20 and holding it within the wedge space between the slot sidewall 14 and the cutting insert. The shoulders 21 on the screws, resulting from their reduced ends 18, abut the wedge strip, and the reduced ends 18 project into the recesses 19 of the wedge for positively holding it in place. The opposite ends of the set screws are provided with any conventional means for being engaged by a turning tool. The wedge strip is of such width that its top edge 22 will be about flush with the top surface of the truncated ridge when it is forced into the space with the recesses 19 aligned to receive the ends of the set screws.

An elongated hard metal tungsten carbide cutting piece 23 is adapted to be inserted within the slot 10 with its cutting edge 24 projecting a substantial distance out of the open end of the slot and above the truncated ridge, and this cutting piece has a bottom surface 25 conforming to the bottom wall of the slot and adapted to seat directly thereupon. The sidewall 30 of the cutting piece is vertically inclined at a slightly larger angle than is the sidewall surface 11 of the slot 10 so that these surfaces will be normally non-parallel, as shown in Fig. 2 of the drawings, but will be brought into parallel relation, as shown in Fig. 3, when the cutting piece 23 is wedged in place with the top of the wedge strip flush with the truncated ridge 9 of the drill body. The angle A in the drill body between the side wall 11 and the bottom wall 12 of the slot is less than the angle B between the bottom wall of the slot and the side wall surface 30 of the cutting piece 23. The side wall surface 30 of the cutting piece is outwardly curved longitudinally of the slot to be convex and conforming to the side wall surface of the slot which is inwardly curved longitudinally to be concave. The adjacent vertically inclined surface walls of the cutting piece and the slot prevent the cutting piece from dropping out of the slot when said cutting piece is clamped in place by the wedge strip 20.

The opposite side wall surface 31 of the cutting piece may be vertical or inclined but is preferably vertical, but, whatever its angle, it is parallel with the adjacent surface of the wedge strip. The wedge strip 20 is inserted within the space between the cutting piece and the portion 16 of the drill bit body, and it has one surface 33 parallel to the side wall surface 31 of the cutting piece and its opposite side wall surface 34 non-parallel to the side wall surface 14 of the slot so that the angle C formed by the sides of the wedge strip is larger than the angle D which is formed between the side wall 14 of the slot and the non-adjacent side wall of the wedge strip. When the wedge strip is pressed home with its top or wider end flush with the truncated ledge of the drill bit body, the cutting insert is forced against the side wall surface 11 of the slot until the corner edge H of the cutting piece contacts the portion J of the side wall surface 11 of the slot. The wing or the overhanging part 13 of the drill bit body, at the top of the slot, will be forced laterally, to the left, by a predetermined amount, regulated by difference in the inclination of adjacent surfaces, which will create a spring-like pressure of the wing or overhanging part of the drill bit body against the top side of the cutting insert where it needs the most support, but the pressure is insufficient to stress the drill bit body laterally to the left from the base of the slot beyond the safety factor to cause fatigue in the steel of the drill bit body. Likewise, the action of pressing the wedge home will cause the point M at the top of the opposite wing of the drill bit body to move laterally to the right by an equal distance and with the same effect for providing a spring-like grip between the wedge strip and the top end of the drill body. Thus, the cutting piece is held in position within the slot by a vice-like spring grip from both top wings of the drill bit body, and the pressure holding the cutting piece is greater at the top than at the bottom of the slot. In fact the degree of inclination of wall surfaces is such that those portions near the base of the slot are merely in contact with little or no lateral pressure being there exerted. This effect is desirable in order to provide the greatest support for the cutting piece nearest to its working point and to reduce pressure at, and adjacent, the base of the slot to avoid stressing the steel of the drill bit body beyond a safe working stress, thereby avoiding fatigue. The wedge strip is provided with the above described recesses 19 which are in position to register with and receive the reduced ends 18 of the screws 117 when it is snugly fitted in position to an accurately predescribed pressure. Only slight wedging stress is required to clamp the cutting piece in place, as said cutting piece is secured within the slot by the overhanging portion 13 of the side wall of the slot bearing against the vertically inclined side wall surface of the cutting piece, and the required pressure may be accurately predetermined, by forming the inclination of the side walls at the desired angle. Furthermore, the pressure for holding the cutting piece is not increased by the drilling operation but is in fact reduced as the vertically inclined wall surfaces between the slot wall and the cutting piece are forced away from, rather than toward, each other by the percussion forces. The desired objective of the novel construction is to distort the side walls of the slot laterally to a predetermined distance at the top of the slot, using the bottom corners of the slot as fulcrums, so that when the wedge strip is forced home the side walls 11 and 14 of the slot and the adjacent side walls 30 and 34 of the cutting insert 23 and the wedge strip 20 will be parallel to each other. The side wall 33 of the wedge 20 is, and remains, parallel to the adjacent side wall of the insert 23. The forcing home of the wedge will cause these surfaces of the side walls to become parallel to each other with the pressure set up in the wings of the drill bit body being greatest at the top but gradually diminishing until it is practically zero at the bottom of the slot. If the wedge strip exerts any substantial pressure at the bottom of the slot, it overstresses the steel laterally thereof, causing failure of the drill bit body at this point.

Lengthwise movement of the cutting insert within the slot is prevented by having means on the drill bolt body or the cutting insert to engage the other member. In the embodiment above described, this is effected by the convex side of the cutting piece conforming to and fitting within the concave wall of the slot.

The embodiments in Figs. 5 and 6 show other means for preventing longitudinal movement of the cutting piece within the slot. In Fig. 5, a vertical rib 26 is formed on the side wall of the cutting insert and a groove 27 of corresponding contour is formed in the side wall of the slot, these being of any configuration. It is preferable to have the rib on the insert and the groove in the wall of the drill bit body, but they could be arranged vice versa. The embodiment in Fig. 6 has flanges 28 on the opposite ends of the cutting insert disposed to overhang and abut against the ends of the drill bit body adjacent the opposite ends of the slot. Except for the rib 26, the groove 27, and the flanges 28 to be used in lieu of the convex and concave conformation of the mating surfaces 11 and 30 of the drill bit body and the cutting insert, the embodiments in Figs. 5 and 6 are like that in Figs. 1 to 4, inclusive. With such interengaging means, the cutting insert is held against lengthwise movement within the slot, and some such holding means is desirable.

Referring to the embodiment in Figs. 7 and 8 inclusive, the slot in the drill bit body has a convex arcuate bottom wall surface 35, and the bottom edge surface 36 of the cutting piece is of concave arcuate form to conform and be parallel with the bottom surface of the slot so that the two surfaces are in contact throughout their lengths. Except for the contour of the bottom edge of the cutting piece and the bottom wall surface of the slot, the construction of the cutting piece, the slot in the drill bit body and the wedge strip, is the same as the embodiment in Figs. 1 to 4, inclusive. This convex arcuate formation of the bottom of the slot and the concave bottom edge of the cutting piece provide a construction which functions to prevent lengthwise movement of the cutting piece relative to the slot, because the cutting insert is wider at its opposite bottom ends than at the medial or center portion by reason of the inclined side wall surfaces 11 and 30 of the respective slot and cutting insert. The transverse width at the medial or center portion of the cutting insert is shown at line 37, whereas the transverse width of the cutting piece at each of its opposite ends is shown at line 38, the medial portion on line 37 being at a higher elevation than the end portions on line 38. Because of this difference in elevation and the inclination of side wall surfaces 11 and 30, the bottom ends of the cutting insert are wider than the medial or center bottom portion. Since the cutting piece is wider at each end than at the center or medial portion, there are opposed double converging tapers, one in from each of the ends toward the center, for preventing any movement of the cutting piece lengthwise within the slot in the drill bit body.

The invention is not limited to any particular type drill or any particular hard metal insert, but is adapted for detachably holding any cutting insert within the drill bit body. The wedge strip is forced into the tapered space between one side surface of the cutting insert and one side wall surface of the slot in the drill bit body to a predetermined pressure that is within the safety factor of the steel of the drill bit body for holding the cutting insert in place. With the wedge strip pressed into wedging position to the desired extent, it can itself be held by any suitable means, such as set screws. In lieu of the set screws, the wedge strip can be spot welded, brazed or otherwise secured, to the drill bit body, as the invention is not limited to any particular means for securing the pressure applying wedge strip in position. The space, between one side wall of the cutting insert and the slot wall, into which the wedge strip fits, is of inverse taper to the wedge strip, thereby causing the wedge to force the opposite surface of the cutting insert against the opposite side wall surface of the slot. The inclination of these latter surfaces is such that wedging action therebetween is opposite to the drilling force, thereby preventing the wedging stress between the cutting insert and the drill bit body being increased during the drilling operation. Any force applied to the cutting edge of the cutting insert forces said insert into the slot and tends to separate the inclined surfaces between the drill bit body and the cutting insert, and thereby lessening, if not in fact entirely relieving, the wedging stress during the percussion blows by the drilling machine.

It is to be understood that the principal feature of this invention is the novel way in which the hard cutting inserts are held in the slot against movement in any direction without the wedging stress being increased by the drilling operation. Although particular materials have been specified for the drill bit body and the cutting inserts, it is apparent that the principle of the invention applies to the novel construction for holding the cutting inserts in the drill bit body rather than in the materials from which either of them are made.

We are aware that the device shown herein may be varied considerably without departing from the spirit of our invention and, therefore, we claim our invention broadly as indicated by the appended claims.

Having thus described our invention, what we claim as new and useful and desire to secure by United States Letters Patent, is:

1. The combination of a percussion drill bit body having a transverse slot therein for holding a cutting insert, said slot having a bottom wall and oppositely disposed side walls, an elongated cutting insert of less width than the slot having one side wall surface disposed at a greater angle than one side wall surface of said slot and having its bottom edge in contact with the bottom wall of the slot, a wedge strip interposed between the opposite side wall surface of the slot and cutting insert for wedging said insert within the drill bit slot, and means for securing the wedge strip in position.

2. The combination set forth in claim 1 in which the means for holding the wedge strip is adjustably connected to the drill bit for engaging the wedge strip.

3. The combination of a percussion drill bit body having a working surface with a slot extending therein transversely of said working surface; an elongated cutting insert seated in the slot with its bottom edge in contact with the bottom wall of the slot and having one of its side surfaces disposed at a greater angle than one side wall surface of the slot; a wedge strip inserted between the opposite side wall surface of the insert and drill bit slot, the side of the wedge strip adjacent the side wall of the slot being at a greater angle than the side wall of the slot; and means on the drill bit body for securing the wedge strip in place.

4. The combination set forth in claim 3 in which the means for holding the wedge strip in place projects through said drill bit body and engages said wedge strip.

5. The combination set forth in claim 3 in which the means for holding the wedge strip in place is adjustably secured to the drill bit body and engages the wedge strip.

6. The combination of a percussion drill bit body having a working surface with a slot extending therein transversely of said working surface, one side wall surface of the slot forming an acute angle with the bottom wall of said slot and the opposite side wall surface of the slot forming an obtuse angle with the bottom wall of the slot; an elongated cutting insert seated in the slot with its bottom edge in contact with the bottom wall of the slot and having one of its side surfaces at a greater angle than that side wall surface of the slot which is at an acute angle, a wedge strip inserted between the adjacent surfaces of the cutting insert and the side wall of the slot which is at an obtuse angle; and means for securing the wedge strip in place.

7. A drill bit body as set forth in claim 6 having means formed on the drill bit body for engaging the cutting insert to prevent lengthwise movement of said cutting insert in the slot.

8. A drill bit body as set forth in claim 6 in which the side wall of the wedge strip adjacent the side wall of the slot is at a greater angle than said side wall of the slot.

9. A drill bit body as set forth in claim 7 in which the engaging means is a projection of one member for fitting against the other member.

10. The combination of a percussion drill bit body having a working surface with a slot extending therein transversely of said working surface, one side wall surface of the slot forming an acute angle with the bottom wall of the slot and the opposite side wall surface of the slot forming an obtuse angle with the bottom wall of the slot; a cutting insert having one side wall surface at a greater angle than that of the side wall surface of the slot which forms an acute angle with the bottom of the slot; a wedge strip fitted between the opposite surface of the slot and cutting insert; and means for securing the wedge strip in position.

11. The combination set forth in claim 10 in which the means for holding the wedge strip in position is adjustably mounted on the drill bit body to engage the wedge strip.

12. The combination set forth in claim 10 in which the means for holding the wedge strip in position is screw threaded to the drill bit body to engage the wedge strip.

13. The combination set forth in claim 10 in which there is included an engaging means between the drill bit body and the cutting insert to hold said cutting insert against lengthwise movement in said slot.

14. The combination of a percussion drill bit body having a working surface with a slot therein with a convex arcuate shaped bottom wall, transversely of the working surface, one side wall surface of the slot forming an acute angle with the bottom wall of the slot and the opposite side wall of the slot forming an obtuse angle with the bottom wall of the slot; an elongated cutting insert having one side wall surface disposed at a greater angle than that side wall surface of the slot which is at an acute angle with the bottom wall surface of the slot, the bottom edge of the cutting insert being shaped to conform to the bottom wall of the slot; a wedge strip inserted between the opposite side wall of the slot and the cutting insert; and means for securing the wedge strip in position.

15. The combination set forth in claim 14 in which the means for holding the wedge strip in position is screw threaded to the drill in position to engage the wedge strip.

16. The combination of a percussion drill bit body having a working surface with a slot therein with a side wall inclined inwardly, from the bottom to the top, toward a vertical plane; a cutting insert, of less width than the slot so that it will be spaced from the opposite wall of the slot, having a side wall face conforming generally to the said inclined side of the slot but at a greater angle; and pressure applying means inserted within the space for holding the insert interengaged within the slot.

17. The combination of a percussion drill bit body having a working surface with a slot therein with a side wall inclined upwardly from the bottom to the top toward a vertical plane; a cutting insert within the slot having a side wall face conforming generally to the inclined side of the slot but at a greater angle; and means associated with the opposite side wall of the slot and insert for pressing said inclined side walls of the slot and insert towards each other.

18. The combination of a percussion drill bit body having a working surface with a slot therein with one side wall inclined upwardly and inwardly from the bottom to the top toward a vertical plane, a cutting insert within the slot having a side wall face inclined oppositely to the inclination of the inclined wall of the slot, and means for forcing the insert against the inclined wall of the slot for causing the adjacent inclined walls of the slot and insert to be interengaged to hold the insert within the slot.

19. The combination as set forth in claim 18 having interengaging means for preventing movement of the insert lengthwise of the slot.

20. The combination of a percussion drill body having a working surface with a slot therein providing a bottom wall and upwardly extending side walls, a cutting insert, of less width than the slot, disposed in said slot with its bottom side resting on the bottom wall of the slot and one side thereof adjacent to one of the side walls of the slot, said adjacent sides of the insert and slot being disposed at different angles to the bottom wall of the slot so that the portions of said adjacent sides near the top of the slot will be in closer contact than are the portions of said adjacent sides near the base of the slot, and clamp means inserted between the opposite adjacent sides of the cutting insert and the slot, above the bottom wall of the slot, for tensioning the cutting insert between the top portions of the side walls of the slot.

21. The combination of a percussion drill as set forth in claim 20 including means for holding the clamp means in place.

ARTHUR H. ALEXANDER.
JOHN H. ALEXANDER.

REFERENCES CITED

The following references are of record in the file of this patent:

UNITED STATES PATENTS

| Number | Name | Date |
|---|---|---|
| 455,963 | Farrar | July 14, 1891 |
| 993,972 | English | May 30, 1911 |
| 1,359,318 | Bernay | Nov. 16, 1920 |
| 1,468,774 | Caldwell | Sept. 25, 1923 |
| 1,718,462 | Hardsocg | June 25, 1929 |
| 2,101,376 | Voigtlander | Dec. 7, 1937 |
| 2,205,238 | Burt | June 18, 1940 |

FOREIGN PATENTS

| Number | Country | Date |
|---|---|---|
| 10,750 | Great Britain | May 12, 1903 |